(12) United States Patent
Fais et al.

(10) Patent No.: US 12,299,840 B2
(45) Date of Patent: May 13, 2025

(54) TRANSPOSED CONVOLUTION ON DOWNSAMPLED DATA

(71) Applicant: Mobileye Vision Technologies Ltd., Jerusalem (IL)

(72) Inventors: Yaniv Fais, Tel Aviv (IL); Ariel Binenfeld, Haifa (IL); Liran Levy, Kiryat Ata (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 476 days.

(21) Appl. No.: 17/739,814

(22) Filed: May 9, 2022

(65) Prior Publication Data

US 2022/0366534 A1 Nov. 17, 2022

Related U.S. Application Data

(60) Provisional application No. 63/186,920, filed on May 11, 2021.

(51) Int. Cl.
*G06T 3/4046* (2024.01)
*G06N 3/04* (2023.01)
*G06T 3/4023* (2024.01)

(52) U.S. Cl.
CPC ............ *G06T 3/4046* (2013.01); *G06N 3/04* (2013.01); *G06T 3/4023* (2013.01)

(58) Field of Classification Search
CPC ....... G06T 3/4046; G06T 3/4023; G06N 3/04; G06N 3/0464; G06N 3/084; G06V 10/20; G06V 10/82; G06V 20/56
See application file for complete search history.

(56) References Cited

U.S. PATENT DOCUMENTS

| | | | |
|---|---|---|---|
| 2009/0015710 A1* | 1/2009 | Hirasawa | H04N 5/917 348/E7.001 |
| 2019/0313109 A1* | 10/2019 | Handford | H04N 19/31 |
| 2020/0012940 A1* | 1/2020 | Liu | H04N 7/0135 |
| 2021/0124794 A1* | 4/2021 | Nair | G06F 17/153 |
| 2021/0287083 A1* | 9/2021 | Bharadwaj | G06N 3/08 |

* cited by examiner

*Primary Examiner* — Amara Abdi
(74) *Attorney, Agent, or Firm* — Schwegman Lundberg & Woessner, P.A.

(57) ABSTRACT

The present subject matter provides technical solutions facing technical problems associated with preserving spatial dimension of images used in CNNs. Transposed convolutional layers may be used to provide improved spatial dimension preservation or reconstruction. In contrast with image interpolation, transposed convolutional layers may use a set of weights to reconstruct input images. When using CNNs for ADAS and AV applications, the transposed convolutional layers may be trained jointly with convolutional layers during the CNN training process. This may provide the ability to use a lower-dimensional representation of input images, while preserving the spatial dimension of images for use in ADAS and AV systems.

17 Claims, 11 Drawing Sheets

| SELECTED SEGMENT OF UPSAMPLED VERSION | DOWNSAMPLED DATA ELEMENT | RELEVANT CONVOLUTION KERNEL ELEMENT |
|---|---|---|
| 121 11 123<br>131 132 133<br>141 21 143 | 11<br><br>21 | 42<br><br>62 |
| 11 123 12<br>132 133 134<br>21 143 22 | 11   12<br><br>21   22 | 41   43<br><br>61   63 |
| 123 12 125<br>133 134 135<br>143 22 145 | 12<br><br>22 | 42<br><br>62 |
| 12 125 13<br>134 135 136<br>22 145 23 | 12   13<br><br>22   23 | 41   43<br><br>61   63 |
| 125 13 127<br>135 136 137<br>145 23 147 | 13<br><br>23 | 42<br><br>62 |

FIG. 6

| SELECTED SEGMENT OF UPSAMPLED VERSION | DOWNSAMPLED DATA ELEMENT | RELEVANT CONVOLUTION KERNEL ELEMENT |
|---|---|---|
| 131 132 133 / 141 21 143 / 151 152 153 |  |  |
| 132 133 134 / 21 143 22 / 152 153 154 |  |  |
| 133 134 135 / 143 22 145 / 123 154 155 |  |  |
| 134 135 136 / 22 145 23 / 154 155 156 |  |  |
| 135 136 137 / 145 23 147 / 155 156 157 |  |  |

| SELECTED SEGMENT OF UPSAMPLED VERSION | DOWNSAMPLED DATA ELEMENT | RELEVANT CONVOLUTION KERNEL ELEMENT |
|---|---|---|
| 141, 21, 143 / 151, 152, 153 / 161, 31, 163 | 21 / 31 | 42 / 62 |
| 21, 143, 22 / 152, 153, 154 / 31, 163, 32 | 21, 22 / 31, 32 | 41, 43 / 61, 63 |
| 143, 22, 145 / 153, 154, 155 / 163, 32, 165 | 22 / 32 | 42 / 62 |
| 22, 145, 23 / 154, 155, 156 / 32, 165, 33 | 22, 23 / 32, 33 | 41, 43 / 61, 63 |
| 145, 23, 147 / 155, 156, 157 / 165, 33, 167 | 23 / 33 | 42 / 62 |

FIG. 8

| SELECTED SEGMENT OF UPSAMPLED VERSION | DOWNSAMPLED DATA ELEMENT | RELEVANT CONVOLUTION KERNEL ELEMENT |
|---|---|---|
| 151 152 153 / 161 31 163 / 171 172 173 | 31 | 52 |
| 152 153 154 / 31 163 32 / 172 173 174 | 31  32 | 51  53 |
| 153 154 155 / 163 32 165 / 173 174 175 | 32 | 52 |
| 154 155 156 / 32 165 33 / 174 175 176 | 32  33 | 51  53 |
| 155 156 157 / 165 33 167 / 175 176 177 | 33 | 52 |

FIG. 9

TRANSPOSED CONVOLUTION ON DOWNSAMPLED DATA

PRIORITY

This application claims the benefit of priority to U.S. Provisional Patent Application Ser. No. 63/186,920, filed May 11, 2021, which is incorporated by reference herein in its entirety.

BACKGROUND

Advanced driver assistance systems (ADAS), and autonomous vehicle (AV) systems use cameras and other sensors together with object classifiers, which are designed to detect specific objects in an environment of a vehicle navigating a road. Object classifiers are designed to detect predefined objects and are used within ADAS and AV systems to control the vehicle or alert a driver based on the type of object that is detected its location, etc.

ADAS and AV systems may process images received from one or more vehicle sensors. The images may be processed by one or more convolution neural networks (CNNs) for various purposes, such as object detection, image classification, or image segmentation. The convolution reduces the spatial dimension of the images and may introduce problems in object segmentation or object localization. There is a growing need to preserve the spatial dimension of the images.

SUMMARY

The present subject matter provides technical solutions facing technical problems associated with preserving spatial dimension of images used in CNNs. Transposed convolutional layers may be used to provide improved spatial dimension preservation or reconstruction. In contrast with image interpolation, transposed convolutional layers may use a set of weights to reconstruct input images. When using CNNs for ADAS and AV applications, the transposed convolutional layers may be trained jointly with convolutional layers during the CNN training process. This may provide the ability to use a lower-dimensional representation of input images, while preserving the spatial dimension of images for use in ADAS and AV systems.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation, autonomous driving, or driver assist technology features. As opposed to fully autonomous driving, driver assist technology may refer to any suitable technology to assist drivers in the navigation or control of their vehicles. Examples of driver assist technology include Forward Collision Warning (FCW), Lane Departure Warning (LDW), Traffic Sign Recognition (TSR), and other driver assist technologies. In various embodiments, the system may include one, two, or more cameras mountable in a vehicle and an associated processor that monitors the environment of the vehicle. In further embodiments, additional types of sensors can be mounted in the vehicle and can be used in the autonomous navigation or driver assist systems. In some examples of the presently disclosed subject matter, the system may provide techniques for processing images of an environment in advance of a vehicle navigating a road, where the processing including training neural networks or deep learning algorithms to estimate a future path of a vehicle based on images. In yet further examples of the presently disclosed subject matter, the system may provide techniques for processing images of an environment in advance of a vehicle navigating a road using a trained neural network to estimate a future path of the vehicle.

There are provided systems and methods, as illustrated in the claims and the specification. Any combination of any subject matter of any claim may be provided. Any combination of any method or method step disclosed in any figure or in the specification may be provided. Any combination of any unit, device, or component disclosed in any figure or in the specification may be provided. Non-limiting examples of such units include a gather unit, an image processor, and the like.

BRIEF DESCRIPTION OF THE DRAWINGS

The subject matter regarded as the subject matter is particularly pointed out and distinctly claimed in the concluding portion of the specification. The subject matter, however, both as to organization and method of operation, together with objects, features, and advantages thereof, may best be understood by reference to the following detailed description when read with the accompanying drawings in which:

FIG. 6 illustrates an example of various steps of applying a convolutional kernel consistent with the disclosed embodiments;

FIG. 8 illustrates an example of various steps of applying a convolutional kernel consistent with the disclosed embodiments;

FIG. 9 illustrates an example of various steps of applying a convolutional kernel consistent with the disclosed embodiments;

DETAILED DESCRIPTION OF THE DRAWINGS

Figure 1:
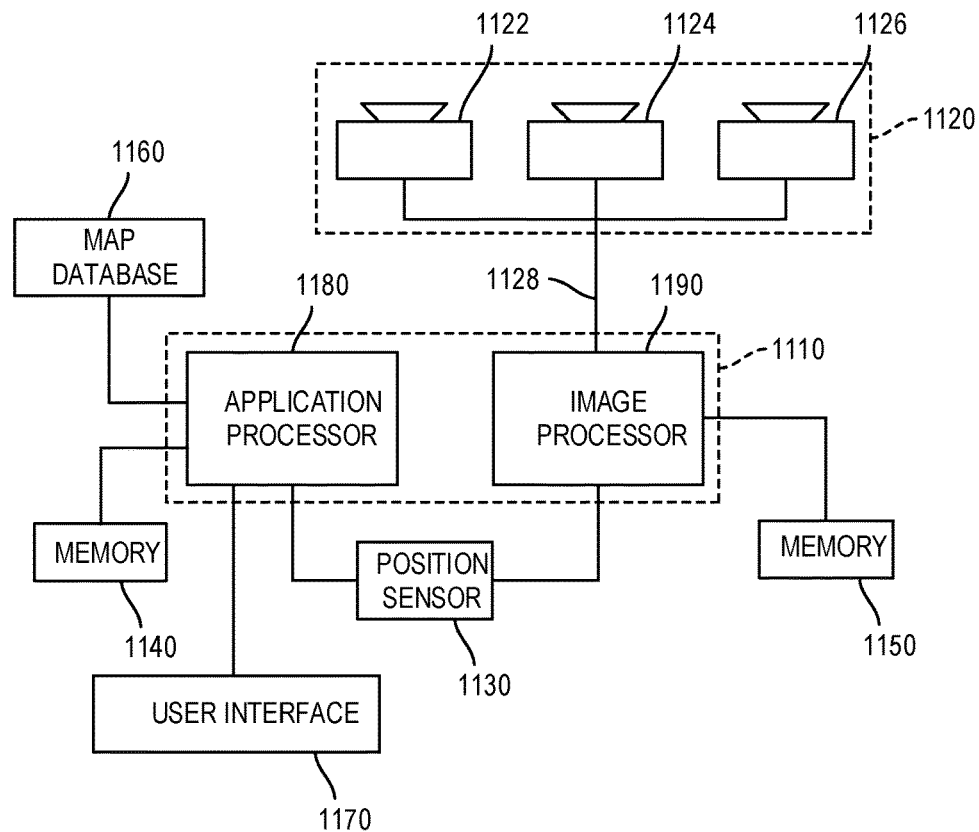
FIG. 1 is a block diagram representation of a system consistent with the disclosed embodiments.

In the following detailed description, numerous specific details are set forth in order to provide a thorough understanding of the subject matter. However, it will be understood by those skilled in the art that the present subject matter may be practiced without these specific details. In other instances, well-known methods, procedures, and components have not been described in detail so as not to obscure the present subject matter.

Transposed convolutional layers may be used to provide improved spatial dimension preservation or reconstruction, which may provide improved performance over upsampling. This transposed convolution includes applying, on downsampled data, a convolution to provide a result that reconstructs the spatial properties of an input data.

One method of executing a transposed reconstruction involves applying a convolution kernel on an upsampled version of the downsampled data (hereinafter "upsampled version"). The upsampled version includes downsampled data elements and padding elements. The padding elements may be zero-valued. The size of the upsampled version exceeds the size of the downsampled data. The upsampled version is stored in a memory unit, segmented, and sequentially processed. The processing may include retrieving a selected segment of the upsampled version from the memory and applying the convolution kernel on the selected segment, which provides an intermediate result that may include a transposed convolution result.

The transposed convolution described herein provides advantages over the application of a convolution kernel on an upsampled version. In particular, transposed convolution reduces the computation involved in the application of a convolution kernel, such as storing padding elements in memory, retrieving padding element from the memory, and applying the convolution kernel on both the padding elements and the downsampled data elements of the upsampled version. Because most of the elements of the upsampled version are padding elements, the transposed convolution described herein reduces or eliminates memory and computational resource that are allocated to irrelevant padding elements. There may be provided a system, a method, and a non-transitory computer readable medium that stores instructions for applying a transposed convolution on downsampled data in an efficient manner.

The subject matter is particularly pointed out and distinctly claimed in the concluding portion of the specification. The subject matter, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present subject matter may be implemented using electronic components and circuits known to those skilled in the art, details will not be explained in any greater extent than that considered necessary for the understanding and appreciation of the underlying concepts of the present subject matter and in order not to obfuscate or distract from the teachings of the present subject matter.

Any reference in the specification to a method should be applied mutatis mutandis to a system capable of executing the method, and should be applied mutatis mutandis to a non-transitory computer readable medium that stores instructions that, once executed by a computer, result in the execution of the method.

Any reference in the specification to a system and any other component should be applied mutatis mutandis to a method that may be executed by the memory device, and should be applied mutatis mutandis to a non-transitory computer readable medium that stores instructions that may be executed by the memory device. For example, there may be provided a method or method steps executed by the image processor, or there may be provided a method or method steps executed by the image processor.

Any reference in the specification to a non-transitory computer readable medium should be applied mutatis mutandis to a system capable of executing the instructions stored in the non-transitory computer readable medium, and should be applied mutatis mutandis to method that may be executed by a computer that reads the instructions stored in the non-transitory computer readable medium.

Any combination of any module or unit listed in any of the figures, any part of the specification, or any claims may be provided. Especially any combination of any claimed feature may be provided.

Various possible implementations and configurations of a vehicle-mountable system may be used for carrying out and implementing the methods according to examples of the presently disclosed subject matter. This vehicle-mountable system may be used to implement features of the present subject matter, such as processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle. In some embodiments, various examples of the system may be mounted in a vehicle, and may be operated while the vehicle is in motion. In some embodiments, the system may implement the methods according to examples of the presently disclosed subject matter.

Embodiments of the present disclosure may include image-based identification of an upright object within the field of view of the vehicle. In some embodiments, a suspected upright object indication may be caused by a high-grade road. The suspected upright object indication may be associated with various other circumstances, and may result from other types of image data and also from data that is not image based or is not exclusively image based.

There may be provided a processing device that may include, for example, processors available from manufacturers such as Intel®, AMD®, etc. and may include various architectures (e.g., x86 processor, ARM®, etc.). There may be provided a device that may include, for example, any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU may perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

There may be provided a device that may include a controller, an image preprocessor, a central processing unit (CPU), support circuits, digital signal processors, integrated circuits, memory, or any other types of devices for image processing and analysis. The image preprocessor may include a video processor for capturing, digitizing, and processing the imagery from the image sensors. The CPU may include any number of microcontrollers or microprocessors. The support circuits may be any number of circuits generally well known in the art, including cache, power supply, clock, and input-output circuits. The memory may store software that, when executed by the processor, controls the operation of the system. The memory may include databases and image processing software, including a trained system, such as a neural network, for example. The memory may include any number of random access memories, read only memories, flash memories, disk drives, optical storage, removable storage, and other types of storage.

FIG. 1, to which reference is now made, is a block diagram representation of a system consistent with the disclosed embodiments. System 1000 can include various components depending on the requirements of a particular implementation. In some examples, system 1000 can include a processing unit 1110, an image acquisition unit 1120, and one or more memory units 1140, 1150. Processing unit 1110 can include one or more processing devices. In some embodiments, processing unit 1110 can include an application processor 1180, an image processor 1190, or any other suitable processing device. Similarly, image acquisition unit 1120 can include any number of image acquisition devices and components depending on the requirements of a particular application. In some embodiments, image acquisition unit 1120 can include one or more image capture devices (e.g., cameras), such as image capture device 1122, image capture device 1124, and image capture device 1126. In some embodiments, system 1000 can also include a data interface 1128 communicatively connecting processing unit 1110 to image acquisition device 1120. For example, data interface 1128 can include any wired or wireless link or links for transmitting image data acquired by image acquisition device 1120 to processing unit 1110.

Both application processor 1180 and image processor 1190 can include various types of processing devices. For example, either or both of application processor 1180 and image processor 1190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 1180 or image processor 1190 can include any type of single or multi-core processor, mobile device microcontroller, central processing unit, or other type of processor. Various processing devices can be used, for example including processors available from manufacturers (e.g., Intel®, AMD®, etc.), and can include various architectures (e.g., x86 processor, ARM®, etc.).

In some embodiments, application processor 1180 or image processor 1190 can include any of the EyeQ series of processor chips available from Mobileye®. These processor designs each include multiple processing units with local memory and instruction sets. Such processors may include video inputs for receiving image data from multiple image sensors, and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP®, the DMA, the second MIPS34K CPU, the multi-channel DMA, and the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 1110, more or fewer processing devices can be used. For example, in some examples, a single processing device may be used to accomplish the tasks of application processor 1180 and image processor 1190. In other embodiments, these tasks can be performed by more than two processing devices.

Processing unit 1110 can include various types of devices. For example, processing unit 1110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random-access memories (RAM), read only memories (ROM), flash memories, disk drives, optical storage, removable storage, and other types of storage. In one instance, the memory can be separate from the processing unit 1110. In another instance, the memory can be integrated into the processing unit 1110.

Each memory 1140, 1150 can include software instructions that when executed by a processor (e.g., application processor 1180 or image processor 1190), can control operation of various aspects of system 1000. These memory units can include various databases and image processing software. The memory units can include random access memory, read only memory, flash memory, disk drives, optical storage, tape storage, removable storage, or any other types of storage. In some examples, memory units 1140, 1150 can be separate from the application processor 1180 or image processor 1190. In other embodiments, these memory units can be integrated into application processor 1180 or image processor 1190.

In some embodiments, the system can include a position sensor 1130. The position sensor 1130 can include any type of device suitable for determining a location associated with at least one component of system 1000. In some embodiments, position sensor 1130 can include a global positioning system (GPS) receiver. Such receivers can determine a user position and velocity by processing signals broadcasted by GPS satellites. Position information from position sensor 1130 can be made available to application processor 1180 or image processor 1190.

In some embodiments, the system 1000 can be operatively connectible to various systems, devices, and units onboard a vehicle in which the system 1000 can be mounted, and through any suitable interfaces (e.g., a communication bus) the system 1000 can communicate with the vehicle's systems. Examples of vehicle systems with which the system 1000 can cooperate include a throttling system, a braking system, and a steering system (e.g., throttling system 2220, braking system 2230, and steering system 2240 of FIG. 2E).

In some embodiments, the system 1000 can include a user interface 1170. User interface 1170 can include any device suitable for providing information to or for receiving inputs from one or more users of system 1000, for example including a touchscreen, microphone, keyboard, pointer devices, track wheels, cameras, knobs, buttons, etc. Information can be provided by the system 1000, through the user interface 1170, to the user.

In some embodiments, the system 1000 can include a map database 1160. The map database 1160 can include any type of database for storing digital map data. In some examples, map database 1160 can include data relating to a position, in a reference coordinate system, of various items, including roads, water features, geographic features, points of interest, etc. Map database 1160 can store not only the locations of such items, but also descriptors relating to those items, for example including names and other information associated with any of the stored features. For example, the database may include locations and types of known obstacles, information about a topography of a road or a grade of certain points along a road, etc. In some embodiments, map database 1160 can be physically located with other components of system 1000. Alternatively or additionally, map database 1160 or a portion thereof can be located remotely with respect to other components of system 1000 (e.g., processing unit 1110). In such remote embodiments, information from map database 1160 can be downloaded over a wired or wireless data connection to a network (e.g., over a cellular network or the Internet, etc.).

Image capture devices 1122, 1124, and 1126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, four, or more image capture devices. Image capture devices 1122, 1124, and 1126 will be further described with reference to FIGS. 2B-2E, below.

It would be appreciated that the system 1000 can include or can be operatively associated with other types of sensors, for example including an acoustic sensor, a radio frequency (RF) sensor (e.g., radar transceiver), a LIDAR sensor, or other sensors. Such sensors can be used independently of or in cooperation with the image acquisition device 1120. For example, data from a radar system (not shown) can be used for validating the processed information that is received from processing images acquired by the image acquisition device 1120, such as to filter certain false positives resulting from processing images acquired by the image acquisition device 1120. Data from a radar system can also be combined with or otherwise compliment the image data from the image acquisition device 1120, or be combined with some processed variation or derivative of the image data from the image acquisition device 1120.

Figure 2A:
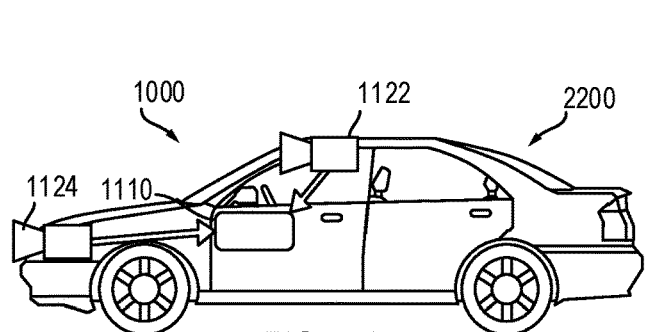
FIG. 2A is a diagrammatic side view representation of an exemplary vehicle including a system consistent with the disclosed embodiments.

System 1000, or various components thereof, can be incorporated into various different platforms. In some embodiments, system 1000 may be included on a vehicle 2200, as shown in FIG. 2A. For example, vehicle 2200 can be equipped with a processing unit 1110 and any of the other components of system 1000, as described above relative to FIG. 1. While in some embodiments, vehicle 2200 can be equipped with only a single-image capture device (e.g., camera), in other embodiments multiple image capture devices can be used, such as those discussed in connection with FIGS. 2B-2E, multiple image capture devices can be used. For example, either of image capture devices 1122 or 1124 of vehicle 2200, as shown in FIG. 2A, can be part of an ADAS (Advanced Driver Assistance Systems) imaging set.

The image capture devices included on vehicle 2200 as part of the image acquisition unit 1120 can be positioned at any suitable location. In some embodiments, as shown in FIGS. 2A-2E and FIG. 3, image capture device 1122 can be located in the vicinity of the rearview mirror (e.g., mirror 3310 of FIG. 3). This position may provide a line of sight similar to that of the driver of vehicle 2200, which can aid in determining what is and is not visible to the driver.

Other locations for the image capture devices of image acquisition unit 1120 can also be used. For example, image capture device 1124 can be located on or in a bumper of vehicle 2200. Such a location can be especially suitable for image capture devices having a wide field of view. The line of sight of bumper-located image capture devices can be different from that of the driver. The image capture devices (e.g., image capture devices 1122, 1124, and 1126) can also be located in other locations. For example, the image capture devices may be located on or in one or both of the side mirrors of vehicle 2200, on the roof of vehicle 2200, on the hood of vehicle 2200, on the trunk of vehicle 2200, on the sides of vehicle 2200, mounted on, positioned behind, or positioned in front of any of the windows of vehicle 2200, and mounted in or near vehicle lights on the front or back of vehicle 2200, or in other locations. The image capture unit 1120, or an image capture device that is one of a plurality of image capture devices that are used in an image capture unit 1120, can have a field-of-view (FOV) that is different than the FOV of a driver of a vehicle, and not always see the same objects. In one example, the FOV of the image acquisition unit 1120 can extend beyond the FOV of a typical driver and can thus image objects which are outside the FOV of the driver. In yet another example, the FOV of the image acquisition unit 1120 is some portion of the FOV of the driver. In some embodiments, the FOV of the image acquisition unit 1120 corresponding to a sector which covers an area of a road in advance of a vehicle and possibly also surroundings of the road.

In addition to image capture devices, vehicle 2200 can be include various other components of system 1000. For example, processing unit 1110 may be included on vehicle 2200 either integrated with or separate from an engine control unit (ECU) of the vehicle 2200. Vehicle 2200 may also be equipped with a position sensor 1130, such as a GPS receiver and may also include a map database 1160 and memory units 1140 and 1150.

Figure 2B:
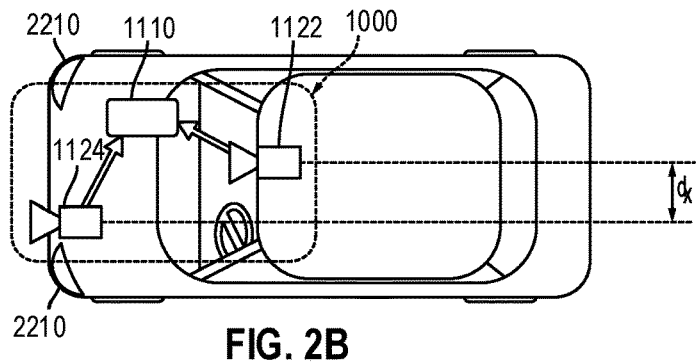
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a system 1000 within a vehicle 2200. The system 1000 may include a first image capture device 1122 positioned in the vicinity of the rearview mirror or near the driver of vehicle 2200, a second image capture device 1124 positioned on or in a bumper region (e.g., one of bumper regions 2210) of vehicle 2200, and a processing unit 1110.

Figure 2C:
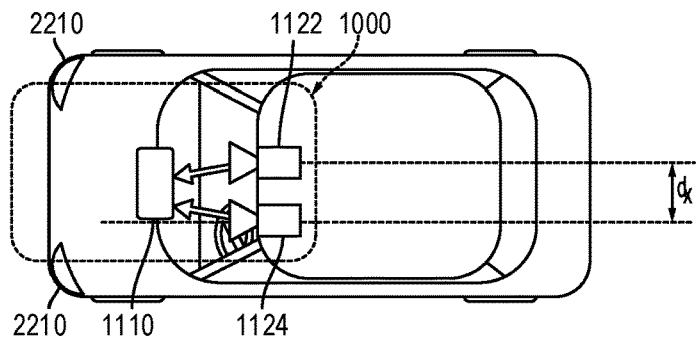
FIG. 2C is a diagrammatic top view representation of another embodiment of a vehicle including a system consistent with the disclosed embodiments.

As illustrated in FIG. 2C, image capture devices 1122 and 1124 may both be positioned in the vicinity of the rearview mirror or near the driver of vehicle 2200. Additionally, while two image capture devices 1122 and 1124 are shown in FIGS. 2B and 2C, it should be understood that other embodiments may include more than two image capture devices. For example, in the embodiment shown in FIG. 2D, system 1000 includes a first image capture device 1122, a second image capture device 1124, and a third image capture device 1126.

Figure 2D:
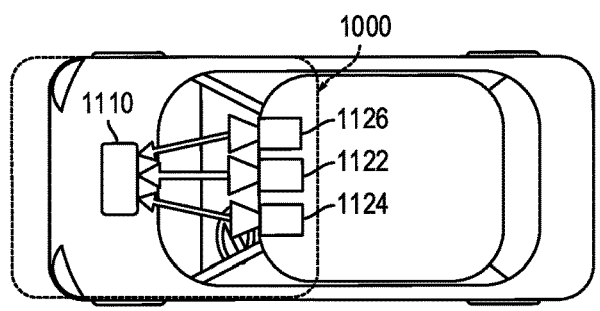
FIG. 2D is a diagrammatic top view representation of yet another embodiment of a vehicle including a system consistent with the disclosed embodiments.

As shown in FIG. 2D, image capture devices 1122, 1124, and 1126 may be positioned in the vicinity of the rearview mirror or near the driver seat of vehicle 2200. The disclosed examples are not limited to any particular number and configuration of the image capture devices, and the image capture devices may be positioned in any appropriate location within or on vehicle 2200. It is also to be understood that disclosed embodiments are not limited to a particular type of vehicle 2200 and may be applicable to all types of vehicles including automobiles, trucks, trailers, motorcycles, bicycles, self-balancing transport devices and other types of vehicles.

The first image capture device 1122 can include any suitable type of image capture device. Image capture device 1122 can include an optical axis. In one instance, the image capture device 1122 can include an Aptina M9V024 WVGA sensor with a global shutter. In another example, a rolling shutter sensor can be used. Image acquisition unit 1120, and any image capture device which is implemented as part of the image acquisition unit 1120, can have any desired image resolution. For example, image capture device 1122 can provide a resolution of 1280×960 pixels and can include a rolling shutter. As used herein, a pixel may include a picture element obtained by a camera, or may include a processed picture element.

Image acquisition unit 1120, and any image capture device that is implemented as part of the image acquisition unit 1120, can include various optical elements. In some embodiments, one or more lenses can be included, such as to provide a desired focal length and field of view for the image acquisition unit 1120. These lenses may be used for any image capture device that is implemented as part of the image acquisition unit 1120. In some examples, an image capture device that is implemented as part of the image acquisition unit 1120 can include or can be associated with any optical elements, such as a 6 mm lens or a 12 mm lens. In some examples, image capture device 1122 can be configured to capture images having a desired and known FOV.

The first image capture device 1122 may have a scan rate associated with acquisition of each of the first series of image scan lines. The scan rate may refer to a rate at which an image sensor can acquire image data associated with each pixel included in a particular scan line.

Figure 2E:
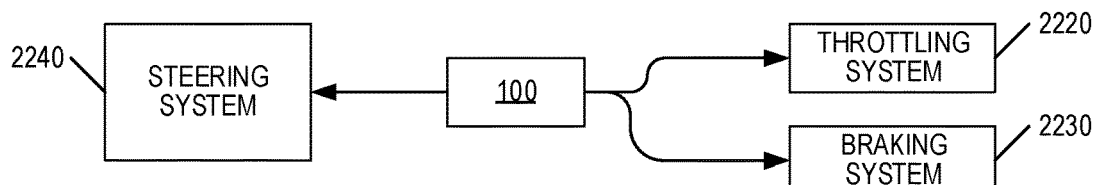
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 2200 can include throttling system 2220, braking system 2230, and steering system 2240. System 1000 can provide inputs (e.g., control signals) to one or more of throttling system 2220, braking system 2230, and steering system 2240 over one or more data links (e.g., any wired or wireless link or links for transmitting data). For example, based on analysis of images acquired by image capture devices 1122, 1124, or 1126, system 1000 can provide control signals to one or more of throttling system 2220, braking system 2230, and steering system 2240 to navigate vehicle 2200 (e.g., by causing an acceleration, a turn, a lane shift, etc.). Further, system 1000 can receive inputs from one or more of throttling system 2220, braking system 2230, and steering system 2240 indicating operating conditions of vehicle 2200 (e.g., speed, whether vehicle 2200 is braking or turning, etc.).

Figure 3:
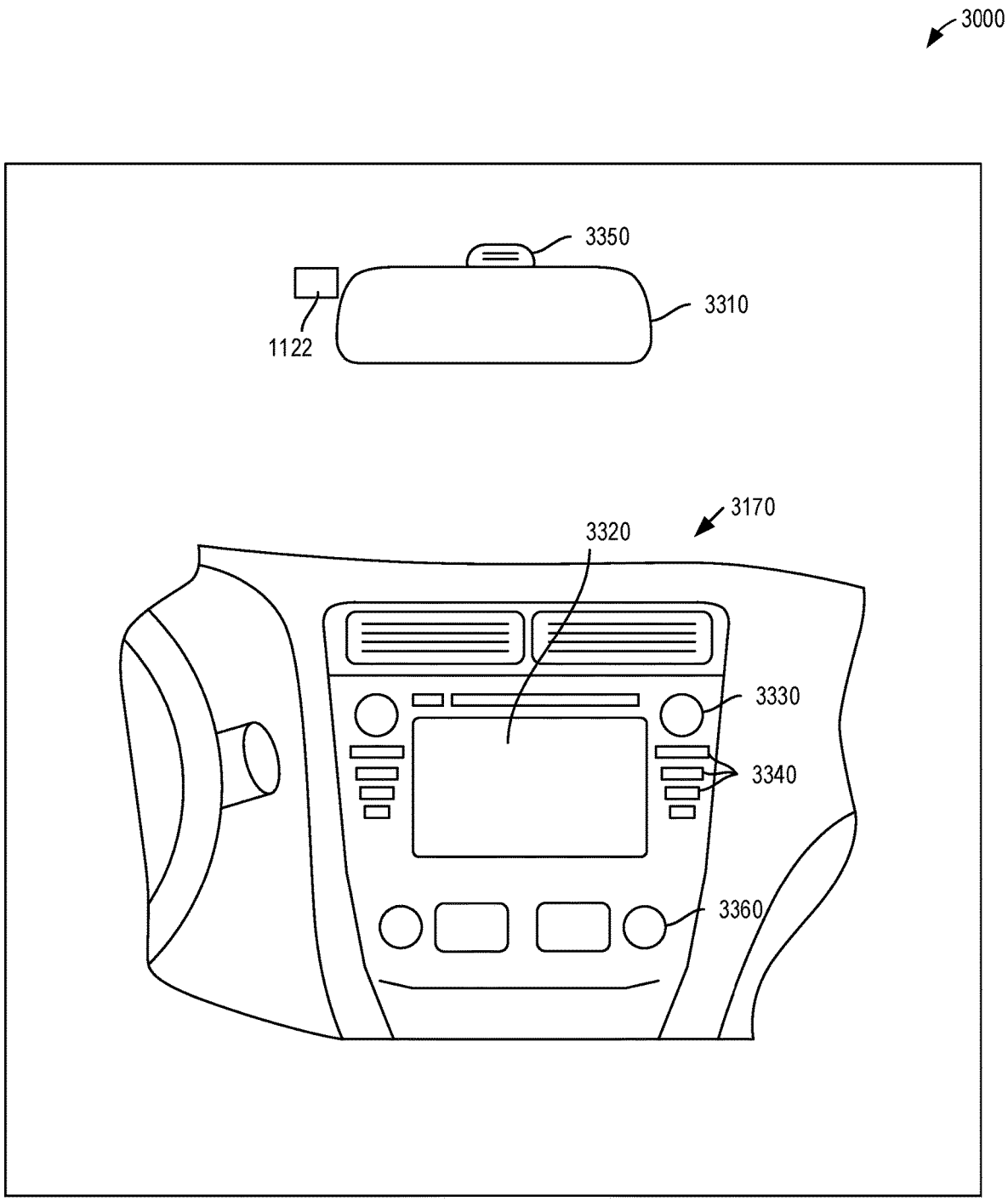
FIG. 3 is a diagrammatic representation of a user interface consistent with the disclosed embodiments.

FIG. 3 is a diagrammatic representation of a user interface 1170 consistent with the disclosed embodiments. As shown in FIG. 3, vehicle 2200 may also include a user interface 1170 for interacting with a driver or a passenger of vehicle 2200. The user interface 1170 may include one or more sensors positioned near a rear-view mirror 3310 or a console display 3320. For example, user interface 1170 in a vehicle application may include a touch screen display 3320, knobs 3330, buttons 3340, and a microphone 3350. A driver or passenger of vehicle 2200 may also use handles (e.g., turn signal handles located on or near the steering column of vehicle 2200), buttons (e.g., located on the steering wheel of vehicle 2200), and the like, to interact with system 1000. In some embodiments, a microphone 3350 may be positioned adjacent to a rearview mirror 3310. Similarly, in some embodiments, image capture device 1122 may be located near rearview mirror 3310. In some embodiments, user interface 1170 may also include one or more speakers 3360 (e.g., speakers of a vehicle audio system). For example, system 1000 may provide various notifications (e.g., alerts) via speakers 3360.

As will be appreciated by a person skilled in the art having the benefit of this disclosure, numerous variations or modifications may be made to the foregoing disclosed embodiments. For example, not all components are essential for the operation of system 1000. Further, any component may be located in any appropriate part of system 1000 and the components may be rearranged into a variety of configurations while providing the functionality of the disclosed embodiments. Therefore, the foregoing configurations are examples and, regardless of the configurations discussed above, system 1000 can provide a wide range of functionality to analyze the surroundings of vehicle 2200 and, in response to this analysis, navigate or otherwise control or operate vehicle 2200. Navigation, control, or operation of vehicle 2200 may include enabling or disabling (directly or via intermediary controllers, such as the controllers mentioned above) various features, components, devices, modes, systems, or subsystems associated with vehicle 2200. Navigation, control, or operation may alternately or additionally include interaction with a user, driver, passenger, passerby, or other vehicle or user, which may be located inside or outside vehicle 2200, for example by providing visual, audio, haptic, or other sensory alerts or indications.

As discussed below in further detail and consistent with various disclosed embodiments, system 1000 may provide a variety of features related to autonomous driving, semi-autonomous driving or driver assist technology. For example, system 1000 may analyze image data, position data (e.g., GPS location information), map data, speed data, or data from sensors included in vehicle 2200. System 1000 may collect the data for analysis from, for example, image acquisition unit 1120, position sensor 1130, and other sensors. Further, system 1000 may analyze the collected data to determine whether or not vehicle 2200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 2200 navigates without human intervention, system 1000 may automatically control the braking, acceleration, or steering of vehicle 2200 (e.g., by sending control signals to one or more of throttling system 2220, braking system 2230, and steering system 1124). Further, system 1000 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 1000 are provided below.

In deep learning, a convolution neural network (CNN, or ConvNet) is a class of deep neural networks, most commonly applied to analyzing visual imagery. They are also known as shift invariant or space invariant artificial neural networks (SIANN), based on their shared-weights architecture and translation invariance characteristics. They have applications in image and video recognition, recommender systems, image classification, medical image analysis, and natural language processing. (www.wikipedia.org).

A convolution neural network includes an input layer, an output layer, as well as multiple hidden layers. The hidden layers of a CNN typically include a series of convolution layers that convolve with a multiplication or other dot product. The activation function is commonly a RELU layer, and is subsequently followed by additional convolutions such as pooling layers, fully connected layers and normalization layers, referred to as hidden layers because their inputs and outputs are masked by the activation function and final convolution. The final convolution, in turn, often involves backpropagation in order to more accurately weight the end product.

Though the layers are colloquially referred to as convolutions, this is only by convention. Mathematically, it is technically a sliding dot product or cross-correlation.

When programming a CNN, each convolution layer within a neural network should have the following attributes:

1) (i) Input is a tensor with shape (number of images)×(image width)×(image height)×(image depth);
2) (ii) Convolution kernels whose width and height are hyper-parameters, and whose depth must be equal to that of the image. Convolution layers convolve the input and pass its result to the next layer. This is similar to the response of a neuron in the visual cortex to a specific stimulus.

Performing convolution operations on input data that includes multiple channels and a depth that exceeds one includes serially processing each one of the input data related to each channel and then adding the results of the different channels that relate to each output channel.

The use of transposed convolutional layers described herein may provide improved spatial dimension preservation or reconstruction. This transposed convolution includes applying, on downsampled data, a convolution to provide a result that reconstructs the spatial properties of an input data, such as described in method 4000 below.

Figure 4:
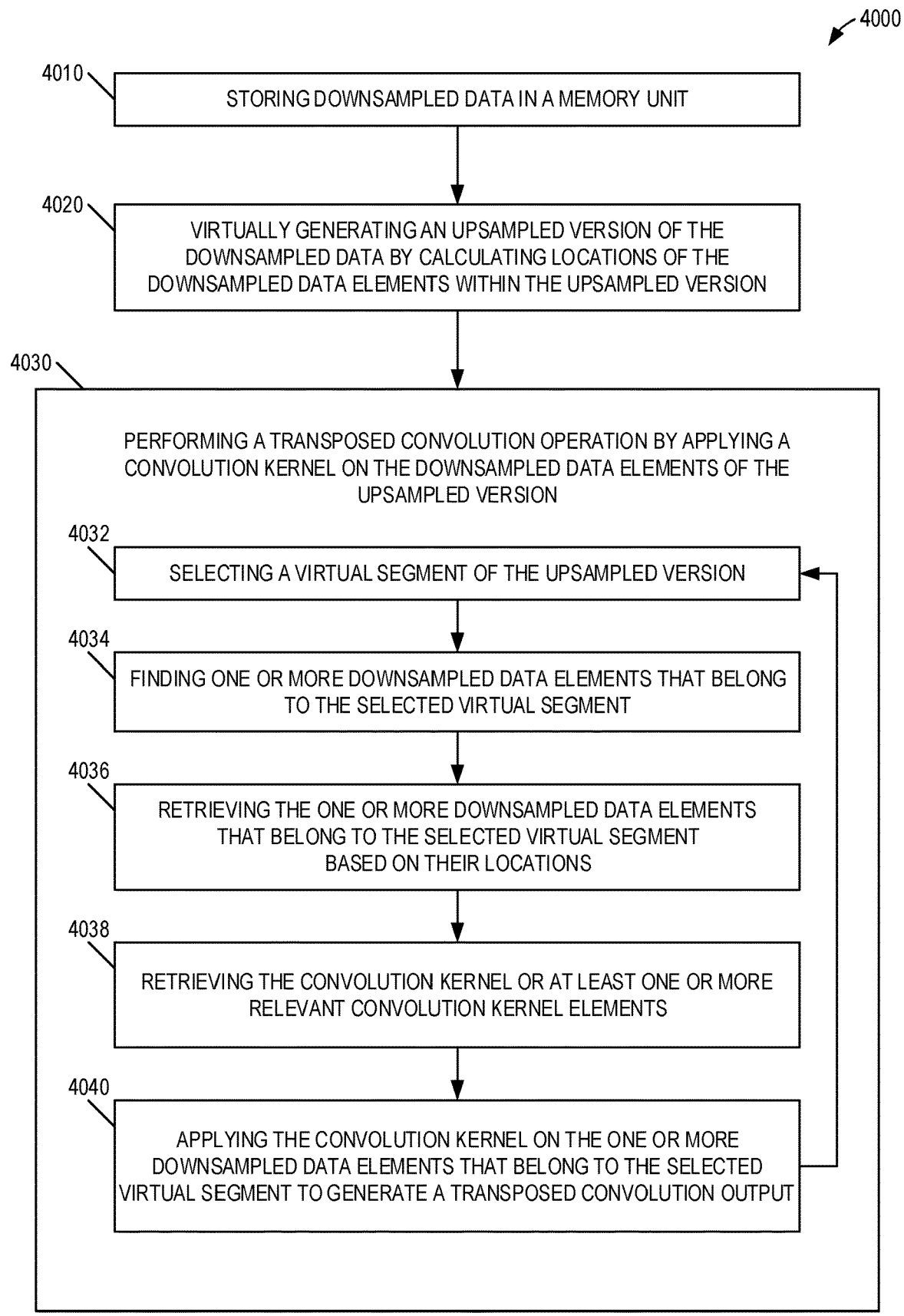
FIG. 4 is a block diagram representation of a method consistent with the disclosed embodiments.

FIG. 4 illustrates method 4000 for applying a transposed convolution on downsampled data. Method 4000 may start by step 4010 of storing the downsampled data in a memory unit. The downsampled data may include downsampled data elements. The downsampled data elements may be arranged in downsampled data segments. A size of a downsampled data segment may be equal to a size of the convolution kernel applied on the downsampled data segment.

Step 4010 may be followed by step 4020 of virtually generating an upsampled version of the downsampled data by calculating locations (e.g., x and y coordinates) of the downsampled data elements within the upsampled version. The padding elements of the upsampled version of the downsampled data are located at other locations within the upsampled version of the downsampled data. This generation of the upsampled version is referred to as "virtual" in that it does not require generating sampled version or storing the sampled version, which may save memory space.

Step 4020 may include receiving one or more upsampling parameters. The virtual generation of the upsampled version may be responsive to receiving the one or more upsampling parameters. The one or more upsampling parameters may determine the relationship between the padding elements and the downsampled data elements, such as the number of padding elements versus the number of the downsampled data elements, the spatial relationship between the downsampled data elements and the padding elements, or other types of data relationships.

Step 4020 may be followed by step 4030 of performing a transposed convolution operation. Step 4030 may include applying, by a processing circuit, a convolution kernel on the downsampled data elements of the upsampled version. Step 4030 may be executed in an iterative manner, such as by processing one virtual segment of the upsampled version after another.

Step 4030 may include steps 4032, 4034, 4036, 4038, and 4040, as described below. Step 4032 may include selecting a virtual segment of the upsampled version. Step 4034 may include finding one or more downsampled data elements that belong to the selected virtual segment. Step 4036 may include retrieving the one or more downsampled data elements that belong to the selected virtual segment based on their locations. Step 4038 may include retrieving the convolution kernel or at least one or more relevant convolution kernel elements. A relevant convolution kernel element is an element that should be multiplied by the one or more downsampled data elements that belong to the selected virtual segment. Step 4040 may include applying the convolution kernel on the one or more downsampled data elements that belong to the selected virtual segment to generate a transposed convolution output. Step 4030 may further include avoiding from applying the convolution kernel on any padding element of the selected virtual segment.

It should be noted that the order of steps may differ from those illustrated in FIG. 4. For example, some of the steps may be executed in parallel to each other, or some of the steps may be executed at an order that differ from those illustrated in FIG. 4. It should be noted that one or more steps of FIG. 4 may be merged or split. For example, step 4020 may be included in step 4030.

Method 4000 may include avoiding from applying the convolution kernel on the padding elements of the upsampled version. Method 4000 may also include avoiding from storing the padding elements of the upsampled version in the memory unit. Method 4000 may further include avoiding from retrieving the padding elements of the upsampled version.

Figure 5:
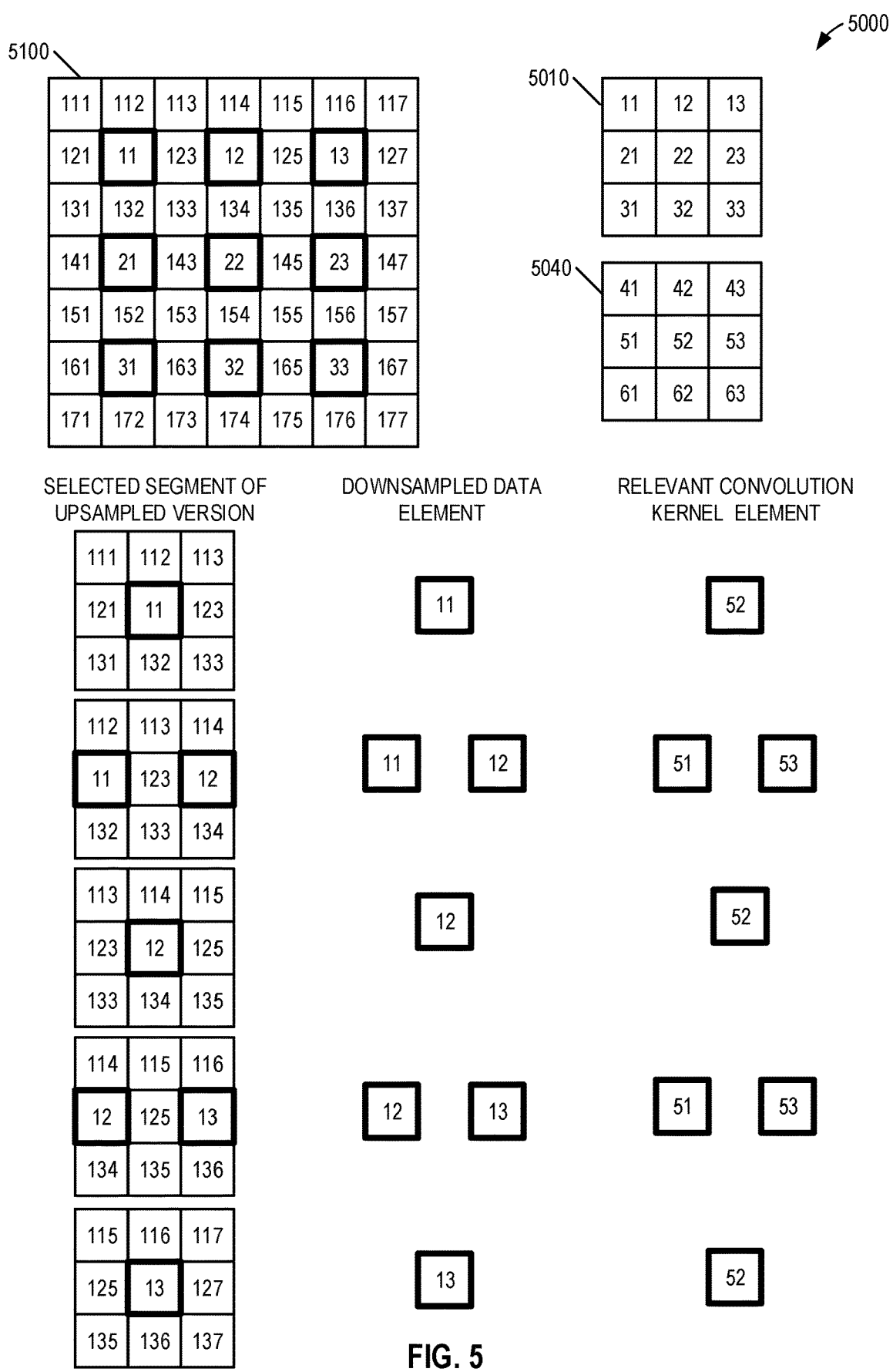
FIG. 5 illustrates an example of a segment of downsampled data, an upsampled version of the segment of the downsampled data, a convolution kernel and various steps of applying a convolutional kernel consistent with the disclosed embodiments.
Figure 7:
FIG. 7 illustrates an example of various steps of applying a convolutional kernel consistent with the disclosed embodiments.
Figure 7:
Figure 7:
Figure 7:
Figure 7:
Figure 7:
Figure 7:
Figure 7:
Figure 7:
Figure 7:

FIG. 5 illustrates an example of a segment 5010 of downsampled data, an upsampled version 5100 of the segment of the downsampled data, and a convolution kernel 5040. FIG. 5 through FIG. 9 illustrate examples of various steps of applying the convolutional kernel. In FIG. 5 through FIG. 9 is it assumed that:

1) The segment 5010 of downsampled data includes nine (3×3) downsampled data elements (denoted 11, 12, 13, 21, 22, 23, 31, 32, and 33).
2) The upsampled version 5100 of the segment 5010 of the downsampled data includes forty nine (7×7) upsampled elements, including the nine downsampled data elements (not located at the (2,2)'th, (2,4)'th, (2,6)'th, (4,2)'th, (4,4)'th, (4,6)'th, (6,2)'th, (6,4)'th and (6,6)'th locations of the upsampled version 5100) and padding elements 111-117, 121, 123, 125, 131-137, 141, 143, 145, 147, 151-157, 161, 163, 165, 167, and 171-177 located at the other locations of the upsampled version 5100.
3) The convolution kernel 5040 includes nine (3×3) convolution kernel elements 41, 42, 43, 51, 52, 53, 61, 62 and 63.

It should be noted that segment 5010 may include fewer or more than nine elements, that upsampled version 5100 may include fewer or more than forty nine elements, and convolution kernel 5040 may include fewer or more than nine elements. The same applies to the output illustrated in Table 1.

It should be noted that while the convolution kernel 5040, the segment 5010 of downsampled data, and the upsampled version 5100 are illustrated as two-dimensional entities, one or more of these may be three-dimensional or have a higher dimensionality that three. In the case of three-dimensional or higher dimensionality, the applicable changes should be applied.

FIG. 5 through FIG. 9 illustrate an applying of the convolution kernel 5040, starting from the top left segment of the upsampled version 5100 and ending at the lower-right portion of upsampled version 5100.

TABLE 1

Segmented Transposed Convolution

| # | Selected segment of upsampled version in a range of 3 × 3 locations (upper left through lower right) | One or more downsampled data element of selected segment | One or more relevant convolution kernel element | Convolution | Output element location |
|---|---|---|---|---|---|
| 1 | (1, 1)'th-(3, 3)'th | 11 | 52 | 11*52 | (1, 1)'th |
| 2 | (1, 2)'th-(3, 4)'th | 11, 12 | 51, 53 | 11*51 + 12*53 | (1, 2)'th |
| 3 | (1, 3)'th-(3, 5)'th | 12 | 52 | 12*52 | (1, 3)'th |
| 4 | (1, 4)'th-(3, 6)'th | 12, 13 | 51, 53 | 12*51 + 13*53 | (1, 4)'th |
| 5 | (1, 5)'th-(3, 7)'th | 13 | 52 | 13*52 | (1, 5)th |
| 6 | (2, 1)'th-(4, 3)'th | 11, 21 | 42, 62 | 11*42 + 12*62 | (2, 1)'th |
| 7 | (2, 2)'th-(4, 4)'th | 11, 12, 21, 22 | 41, 43, 61, 63 | 11*41 + 12*43 + 21*61 + 22*63 | (2, 2)'th |
| 8 | (2, 3)'th-(4, 5)'th | 12, 22 | 42, 62 | 12*42 + 22*62 | (2, 3)'th |
| 9 | (2, 4)'th-(4, 6)'th | 12, 13, 22, 23 | 41, 43, 61, 63 | 12*41 + 13*43 + 23*61 + 23*63 | (2, 4)'th |
| 10 | (2, 5)'th-(4, 7)'th | 13, 23 | 42, 62 | 13*42 + 23*62 | (2, 5)th |
| 11 | (3, 1)'th-(5, 3)'th | 21 | 52 | 21*52 | (2, 1)'th |
| 12 | (3, 2)'th-(5, 4)'th | 21, 22 | 51, 53 | 21*51 + 22*53 | (3, 1)'th |
| 13 | (3, 3)'th-(5, 5)'th | 22 | 52 | 22*52 | (3, 2)'th |
| 14 | (3, 4)'th-(5, 6)'th | 22, 23 | 51, 53 | 22*51 + 23*53 | (3, 3)'th |
| 15 | (3, 5)'th-(5, 7)'th | 23 | 52 | 23*52 | (3, 4)'th |
| 16 | (4, 1)'th-(6, 3)'th | 21, 31 | 42, 62 | 21*42 + 31*62 | (3, 5)th |
| 17 | (4, 2)'th-(6, 4)'th | 21, 22, 31, 32 | 41, 43, 61, 63 | 21*41 + 22*43 + 31*61 + 32*63 | (4, 1)'th |
| 18 | (4, 3)'th-(6, 5)'th | 22, 32 | 42, 62 | 22*42 + 32*62 | (4, 2)'th |
| 19 | (4, 4)'th-(6, 6)'th | 22, 23, 32, 33 | 41, 43, 61, 63 | 22*41 + 23*43 + 32*61 + 33*63 | (4, 3)'th |
| 20 | (4, 5)'th-(6, 7)'th | 23, 33 | 42, 62 | 23*42 + 33*62 | (4, 4)'th |
| 21 | (5, 1)'th-(7, 3)'th | 31 | 52 | 31*52 | (5, 1)'th |
| 22 | (5, 2)'th-(7, 4)'th | 31, 32 | 51, 53 | 31*51 + 32*53 | (5, 2)'th |
| 23 | (5, 3)'th-(7, 5)'th | 32 | 52 | 32*52 | (5, 3)'th |
| 24 | (5, 4)'th-(7, 6)'th | 32, 33 | 51, 53 | 32*51 + 33*53 | (5, 4)'th |
| 25 | (5, 5)'th-(7, 7)'th | 33 | 52 | 33*33 | (5, 1)'th |

Figure 10:
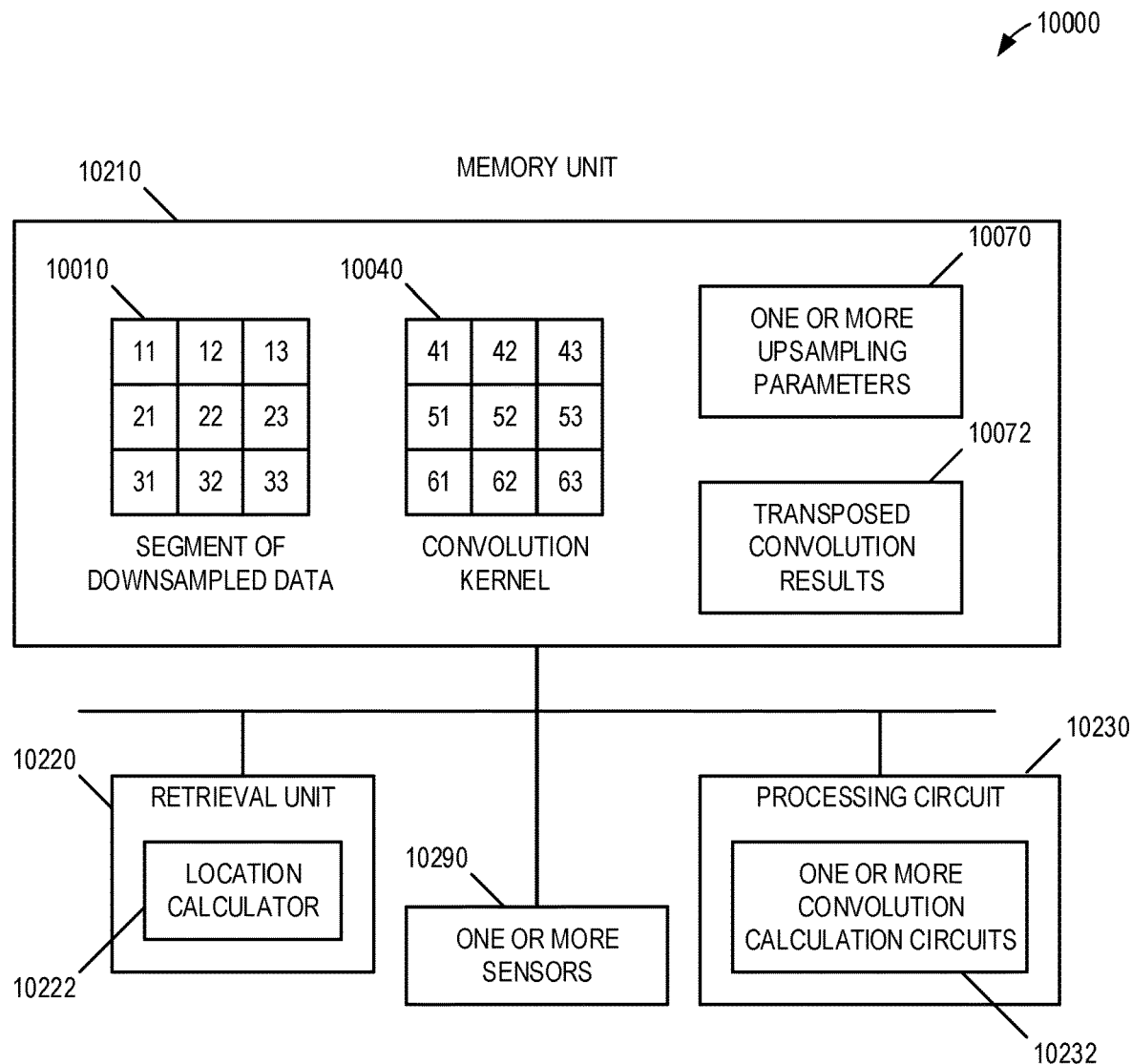
FIG. 10 is a block diagram representation of a device consistent with the disclosed embodiments.

FIG. 10 illustrates an example of a device 10200. Device 10200 may include a memory unit 10210, a retrieval unit 10220, one or more sensors 10290, and a processing circuit 10230. The one or more sensors 10290 may include one or more a vehicle sensors or non-vehicle sensors.

Memory unit 10210 may store a segment of downsampled data 10010, convolution kernel 10040, one or more upsampling parameters 10070, and transposed convolution results 10072. Memory unit 10210 may also store instructions for executing method 4000.

The processing circuit 10230 may include one or more convolution calculation circuits 10232. These convolution calculation circuits 10232 may include arithmetic logic units, convolution hardware accelerators, or other calculation circuits.

The retrieval unit 10220 may include a location calculator 10222. The location calculator 10222 may be configured to calculate the locations of downsampled data elements within upsampled version of the downsampled data. The location calculator may also be configured to calculate retrieval metadata for retrieving one or more of the downsampled data elements. The location calculator 10220 may include an address generation unit (AGU). In an embodiment, the location calculator 10222 may be configured to execute only one of (a) calculating the locations of downsampled data elements within upsampled version of the downsampled data, or (b) calculating the retrieval metadata. The location calculator 10222 may be included within or be separate from the retrieval unit 10220.

The device 10200 may be configured to execute method 4000. The processing circuit 10230 is configured to calculate a transposed convolution result by applying, by a processing circuit, a convolution kernel on the downsampled data elements of the upsampled version of the downsampled data to provide a transposed convolution outcome.

Figure 11:
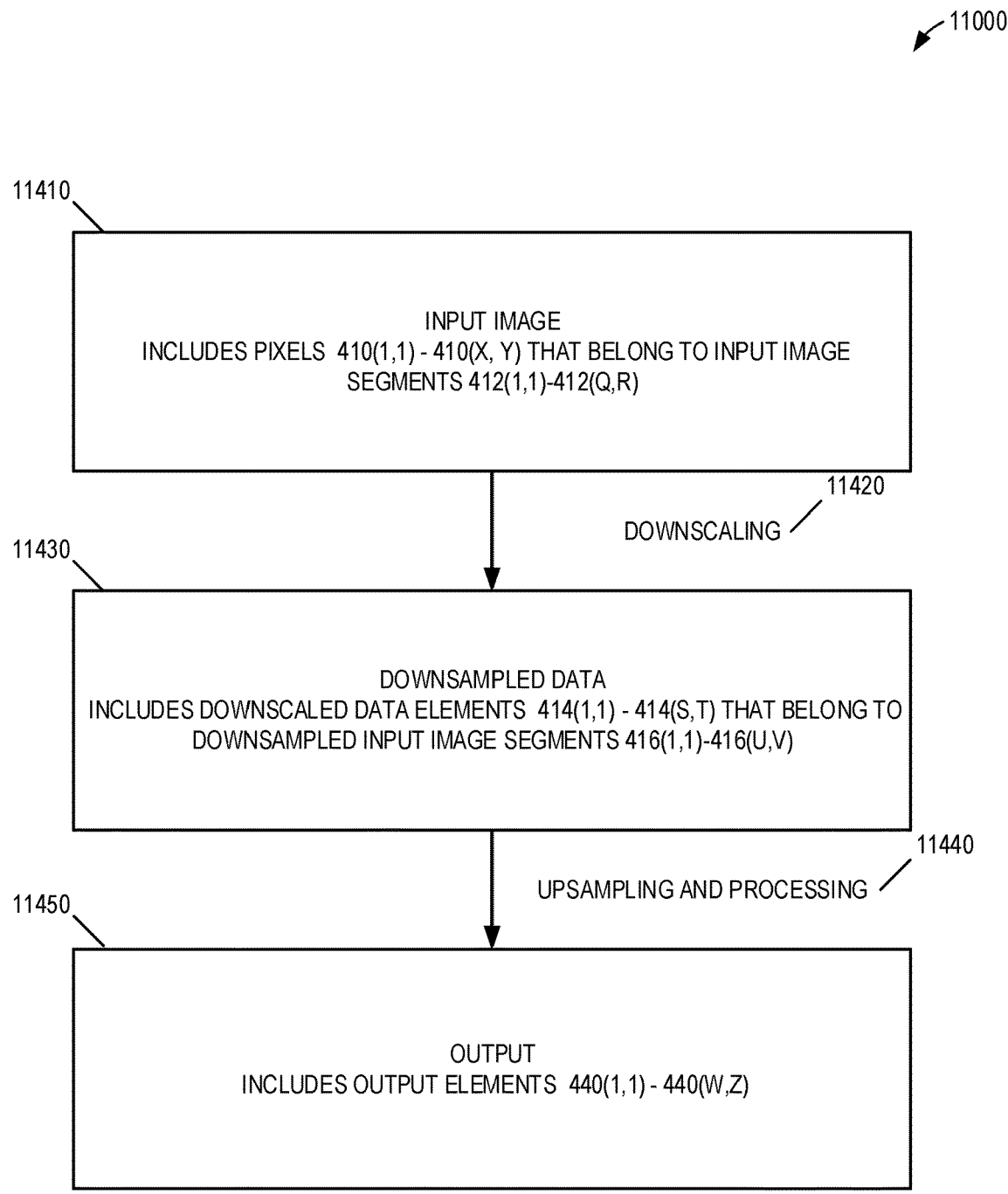
FIG. 11 is a block diagram representation of an input image consistent with the disclosed embodiments.

FIG. 11 illustrates an example of a process that includes (a) receiving an input image 11410 that includes X×Y pixels 11410(1,1)-11410(X,Y) that belong to Q×R input image segments 11420(1,1)-11420(Q,R), (b) downscaling 11420 the input image to provide downsampled data 11414 that includes S×T downsampled data elements 11414(1,1)-11414(S,T) that belong to U×V segments 11440(1,1)-11440(U,V) of downsampled data elements, and (c) upsampling and processing 11440 the downsampled data 11414 to provide output 11450 that includes W×Z output data elements 11450 (1,1)-11450(W,Z).

In some embodiments, W may be substantially equal to U. In some embodiments, V may be substantially equal to Z. The U×V segments may include segments such as segment 5010 of FIG. 5.

The upsampling and processing 11440 may include executing method 4000. Output 11450 may include transposed convolution results, and the transposed convolution results may be further processed to provide output 11450. Output 11450 may be an output image or another transposed convolution output.

The subject matter may also be implemented in a computer program for running on a computer system, at least including code portions for performing steps of a method according to the subject matter when run on a programmable apparatus, such as a computer system or enabling a programmable apparatus to perform functions of a device or system according to the subject matter. The computer program may cause the storage system to allocate disk drives to disk drive groups.

A computer program is a list of instructions such as a particular application program or an operating system. The computer program may for instance include one or more of: a subroutine, a function, a procedure, an object method, an object implementation, an executable application, an applet, a servlet, a source code, an object code, a shared library or dynamic load library or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory, and a number of input/output (I/O) devices. When executing the computer program, the computer system processes information according to the computer program and produces resultant output information via I/O devices.

In the foregoing specification, the subject matter has been described with reference to specific examples of embodiments of the subject matter. It will, however, be evident that various modifications and changes may be made therein without departing from the broader spirit and scope of the subject matter as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

To better illustrate the method and apparatuses disclosed herein, a non-limiting list of example embodiments is provided here.

Example 1 is a system for applying a transposed convolution on downsampled data, the system comprising: processing circuitry; and a memory that includes, instructions, the instructions, when executed by the processing circuitry, cause the processing circuitry to: store a downsampled data in a memory, wherein the downsampled data comprises downsampled data elements; generate an upsampled version of the downsampled data, the generation comprising: calculate locations of the downsampled data elements within the upsampled version of the downsampled data; and add padding elements of the upsampled version of the downsampled data to vacant locations other than the locations of the downsampled data elements within the upsampled version of the downsampled data; and perform a transposed convolution operation by applying a convolution kernel on the downsampled data elements of the upsampled version of the downsampled data to generate a transposed convolution output.

In Example 2, the subject matter of Example 1 includes, wherein: the downsampled data corresponds to a downsampled input image; and the transposed convolution output includes an upsampled output image, the transposed convolution output providing an upsampling of the downsampled input image.

In Example 3, the subject matter of Example 2 includes, the system further comprising an image capture device to capture an input captured image, wherein the downsampled input image corresponds to a downsampled version of the input captured image.

In Example 4, the subject matter of Examples 1-3 includes, wherein the instructions causing the processing circuitry to perform of the transposed convolution operation further causes the circuitry to refrain from applying the convolution kernel on the padding elements of the upsampled version of the downsampled data.

In Example 5, the subject matter of Examples 1-4 includes, wherein the instructions causing the processing circuitry to add the padding elements further causes the circuitry to refrain from storing the padding elements of the upsampled version of the downsampled data in the memory.

In Example 6, the subject matter of Examples 1-5 includes, wherein the instructions causing the processing circuitry to calculate of the locations of the downsampled data elements within the upsampled version of the downsampled data further causes the circuitry to refrain from retrieving the padding elements of the upsampled version of the downsampled data.

In Example 7, the subject matter of Examples 1-6 includes, wherein the instructions causing the processing circuitry to perform of the transposed convolution operation further causes the circuitry to: select a virtual segment of the upsampled version; identify one or more downsampled virtual data elements within the selected virtual segment; apply the convolution kernel on the one or more downsampled virtual data elements; identify one or more virtual padding elements within the selected virtual segment; and refrain from applying the convolution kernel on the one or more virtual padding elements.

In Example 8, the subject matter of Examples 1-7 includes, the instructions further causing the processing circuitry to receive one or more upsampling parameters, wherein: the generating of the upsampled version of the downsampled data is responsive to the one or more upsampling parameters; and the generating of the upsampled version of the downsampled data is further based on the one or more upsampling parameters.

Example 9 is a method for applying a transposed convolution on downsampled data, the method comprising: storing a downsampled data in a memory, wherein the downsampled data comprises downsampled data elements; generating an upsampled version of the downsampled data, the generating comprising: calculating locations of the downsampled data elements within the upsampled version of the downsampled data; and adding padding elements of the upsampled version of the downsampled data to vacant locations other than the locations of the downsampled data elements within the upsampled version of the downsampled data; and performing a transposed convolution operation by applying, by processing circuitry, a convolution kernel on the downsampled data elements of the upsampled version of the downsampled data to generate a transposed convolution output.

In Example 10, the subject matter of Example 9 includes, wherein: the downsampled data corresponds to a downsampled input image; and the transposed convolution output includes an upsampled output image, the transposed convolution output providing an upsampling of the downsampled input image.

In Example 11, the subject matter of Examples 9-10 includes, wherein the performing of the transposed convolution operation comprises refraining from applying the convolution kernel on the padding elements of the upsampled version of the downsampled data.

In Example 12, the subject matter of Examples 9-11 includes, wherein the adding of the padding elements comprises refraining from storing the padding elements of the upsampled version of the downsampled data in the memory.

In Example 13, the subject matter of Examples 9-12 includes, wherein the calculating of the locations of the downsampled data elements within the upsampled version of the downsampled data comprises refraining from retrieving the padding elements of the upsampled version of the downsampled data.

In Example 14, the subject matter of Examples 9-13 includes, wherein the performing of the transposed convolution operation comprises: selecting a virtual segment of the upsampled version; identifying one or more downsampled virtual data elements within the selected virtual segment; applying the convolution kernel on the one or more downsampled virtual data elements; identifying one or more virtual padding elements within the selected virtual segment; and refraining from applying the convolution kernel on the one or more virtual padding elements.

In Example 15, the subject matter of Examples 9-14 includes, receiving one or more upsampling parameters, wherein: the generating of the upsampled version of the downsampled data is responsive to the one or more upsampling parameters; and the generating of the upsampled version of the downsampled data is further based on the one or more upsampling parameters.

Example 16 is one or more machine-readable medium including instructions, which when executed by a computing system, cause the computing system to perform any of the methods of Examples 9-15.

Example 17 is an apparatus comprising means for performing any of the methods of Examples 9-15.

Example 18 is at least one non-transitory machine-readable storage medium, comprising a plurality of instructions that, responsive to being executed with processor circuitry of a computer-controlled device, cause the computer-controlled device to: store a downsampled data in a memory, wherein the downsampled data comprises downsampled data elements; generate an upsampled version of the downsampled data, the generation comprising: calculating locations of the downsampled data elements within the upsampled version of the downsampled data; and adding padding elements of the upsampled version of the downsampled data to vacant locations other than the locations of the downsampled data elements within the upsampled version of the downsampled data; and perform a transposed convolution operation by applying, by processing circuitry, a convolution kernel on the downsampled data elements of the upsampled version of the downsampled data to generate a transposed convolution output.

In Example 19, the subject matter of Example 18 includes, wherein: the downsampled data corresponds to a downsampled input image; and the transposed convolution output includes an upsampled output image, the transposed convolution output providing an upsampling of the downsampled input image.

In Example 20, the subject matter of Examples 18-19 includes, the instructions causing the computer-controlled device to perform the transposed convolution operation further causes the circuitry to refrain from applying the convolution kernel on the padding elements of the upsampled version of the downsampled data.

In Example 21, the subject matter of Examples 18-20 includes, wherein the instructions causing the computer-controlled device to add the padding elements further causes the circuitry to refrain from storing the padding elements of the upsampled version of the downsampled data in the memory.

In Example 22, the subject matter of Examples 18-21 includes, wherein the instructions causing the computer-controlled device to calculate of the locations of the downsampled data elements within the upsampled version of the downsampled data further causes the circuitry to refrain from retrieving the padding elements of the upsampled version of the downsampled data.

In Example 23, the subject matter of Examples 18-22 includes, wherein the instructions causing the computer-controlled device to perform of the transposed convolution operation further causes the circuitry to: select a virtual segment of the upsampled version; identify one or more downsampled virtual data elements within the selected virtual segment; apply the convolution kernel on the one or more downsampled virtual data elements; identify one or more virtual padding elements within the selected virtual segment; and refrain from applying the convolution kernel on the one or more virtual padding elements.

In Example 24, the subject matter of Examples 18-23 includes, the instructions further causing the computer-controlled device to receive one or more upsampling parameters, wherein: the generating of the upsampled version of the downsampled data is responsive to the one or more upsampling parameter; and the generating of the upsampled version of the downsampled data is further based on the one or more upsampling parameter.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the subject matter is not limited to physical devices or units implemented in non-programmable hardware but may also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems." Other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to subject matter containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the subject matter have been illustrated and described herein, many modifications, substitutions, changes, and equivalents will now occur to those of ordinary skill in the art. It is, therefore, to be understood that the appended claims are intended to cover all such modifications and changes as fall within the true spirit of the subject matter.

The invention claimed is:

1. A system for applying a transposed convolution on downsampled data, the system comprising:
    processing circuitry; and
    a memory that includes instructions, the instructions, when executed by the processing circuitry, cause the processing circuitry to:
    store a downsampled data in a memory, wherein the downsampled data comprises downsampled data elements;
    virtually generate an upsampled version of the downsampled data, the generation comprising:
        selecting a virtual segment of the upsampled version of the downsampled data;
        identifying downsampled virtual data elements within the selected virtual segment;
        identifying virtual padding elements of the upsampled version of the downsampled data to vacant locations other than the locations of the downsampled data elements within the upsampled version of the downsampled data;
        performing a transposed convolution operation by applying a convolution kernel on the downsampled virtual data elements of the upsampled version of the downsampled data to generate a transposed convolution output; and
        refraining from applying the convolution kernel on the virtual padding elements.

2. The system according to claim 1, wherein:
    the downsampled data corresponds to a downsampled input image; and
    the transposed convolution output includes an upsampled output image, the transposed convolution output providing an upsampling of the downsampled input image.

3. The system according to claim 2, the system further comprising an image capture device to capture an input captured image, wherein the downsampled input image corresponds to a downsampled version of the input captured image.

4. The system according to claim 1, wherein the instructions causing the processing circuitry to perform of the transposed convolution operation further causes the circuitry to refrain from applying the convolution kernel on the padding elements of the upsampled version of the downsampled data.

5. The system according to claim 1, wherein the instructions causing the processing circuitry to add the padding elements further causes the circuitry to refrain from storing the padding elements of the upsampled version of the downsampled data in the memory.

6. The system according to claim 1, wherein the instructions causing the processing circuitry to calculate of the locations of the downsampled data elements within the upsampled version of the downsampled data further causes the circuitry to refrain from retrieving the padding elements of the upsampled version of the downsampled data.

7. The system according to claim 1, the instructions further causing the processing circuitry to receive one or more upsampling parameters, wherein:
    the generating of the upsampled version of the downsampled data is responsive to the one or more upsampling parameters; and
    the generating of the upsampled version of the downsampled data is further based on the one or more upsampling parameters.

8. A method for applying a transposed convolution on downsampled data, the method comprising:
    storing a downsampled data in a memory, wherein the downsampled data comprises downsampled data elements; and
    virtually generating an upsampled version of the downsampled data, the generating comprising:
        selecting a virtual segment of the upsampled version of the downsampled data;
        identifying downsampled virtual data elements within the selected virtual segment;
        identifying virtual padding elements of the upsampled version of the downsampled data to vacant locations other than the locations of the downsampled data elements within the upsampled version of the downsampled data;
        performing a transposed convolution operation by applying a convolution kernel on the downsampled virtual data elements of the upsampled version of the downsampled data to generate a transposed convolution output; and
        refraining from applying the convolution kernel on the virtual padding elements.

9. The method according to claim 8, wherein:
    the downsampled data corresponds to a downsampled input image; and
    the transposed convolution output includes an upsampled output image, the transposed convolution output providing an upsampling of the downsampled input image.

10. The method according to claim 8, wherein the performing of the transposed convolution operation comprises refraining from applying the convolution kernel on the padding elements of the upsampled version of the downsampled data.

11. The method according to claim 8, wherein the adding identifying of the virtual padding elements comprises refraining from storing the padding elements of the upsampled version of the downsampled data in the memory.

12. The method according to claim 8, wherein the selecting a virtual segment of the upsampled version of the downsampled data comprises refraining from retrieving the padding elements of the upsampled version of the downsampled data.

13. The method according to claim 8, further comprising receiving one or more upsampling parameters, wherein:
   the generating of the upsampled version of the downsampled data is responsive to the one or more upsampling parameters; and
   the generating of the upsampled version of the downsampled data is further based on the one or more upsampling parameters.

14. At least one non-transitory machine-readable storage medium, comprising a plurality of instructions that, responsive to being executed with processor circuitry of a computer-controlled device, cause the computer-controlled device to:
   store a downsampled data in a memory, wherein the downsampled data comprises downsampled data elements; and
   virtually generate an upsampled version of the downsampled data, the generation comprising:
      selecting a virtual segment of the upsampled version of the downsampled data;
      identifying downsampled virtual data elements within the selected virtual segment;
      adding identifying virtual padding elements of the upsampled version of the downsampled data to vacant locations other than the locations of the downsampled data elements within the upsampled version of the downsampled data;
      performing a transposed convolution operation by applying a convolution kernel on the downsampled virtual data elements of the upsampled version of the downsampled data to generate a transposed convolution output; and
      refraining from applying the convolution kernel on the virtual padding elements.

15. The non-transitory machine-readable storage medium according to claim 14, wherein:
   the downsampled data corresponds to a downsampled input image; and
   the transposed convolution output includes an upsampled output image, the transposed convolution output providing an upsampling of the downsampled input image.

16. The non-transitory machine-readable storage medium according to claim 14, the instructions causing the computer-controlled device to perform the transposed convolution operation further causes the circuitry to refrain from applying the convolution kernel on the padding elements of the upsampled version of the downsampled data.

17. The non-transitory machine-readable storage medium according to claim 14, the instructions further causing the computer-controlled device to receive one or more upsampling parameters, wherein:
   the generating of the upsampled version of the downsampled data is responsive to the one or more upsampling parameter; and
   the generating of the upsampled version of the downsampled data is further based on the one or more upsampling parameter.

* * * * *